United States Patent [19]
Alana

[11] Patent Number: 5,943,778
[45] Date of Patent: Aug. 31, 1999

[54] EASY CUTTER

[76] Inventor: Michael A. Alana, 1413 Rosharon Rd., #10, Alvin, Tex. 77511

[21] Appl. No.: 09/053,689

[22] Filed: Apr. 2, 1998

[51] Int. Cl.$^6$ ..................................................... B23D 21/08
[52] U.S. Cl. ................................................ 30/101; 30/102
[58] Field of Search ................................ 30/101, 102, 95, 30/94; 82/58

[56] References Cited

U.S. PATENT DOCUMENTS

| | | |
|---|---|---|
| 4,802,278 | 2/1989 | Vanderpol et al. . |
| 5,088,196 | 2/1992 | Fukuda . |
| 5,103,699 | 4/1992 | Brown . |
| 5,133,234 | 7/1992 | Ehlert et al. . |
| 5,301,427 | 4/1994 | Swatek . |
| 5,315,759 | 5/1994 | Mashata . |
| 5,528,830 | 6/1996 | Hansen . |
| 5,829,142 | 11/1998 | Reiser ..................................... 30/95 X |

*Primary Examiner*—Douglas D. Watts
*Attorney, Agent, or Firm*—Patent & Trade Mark Services; Joseph H. McGlynn

[57] ABSTRACT

A cutting tool for cutting pipes or tubes, and in which the cutter has a pair of driving wheels, which can be driven by either AC or DC power. The driving wheels are positioned adjacent a cutting wheel that is operated by a lever to advance the cutting wheel against the item to be cut. The cutting wheel is locked against the item to be cut by a releasable latch. In addition, a deburring tool is provided which can be attached to remove any irregularities in the cut pipe or tube.

15 Claims, 3 Drawing Sheets

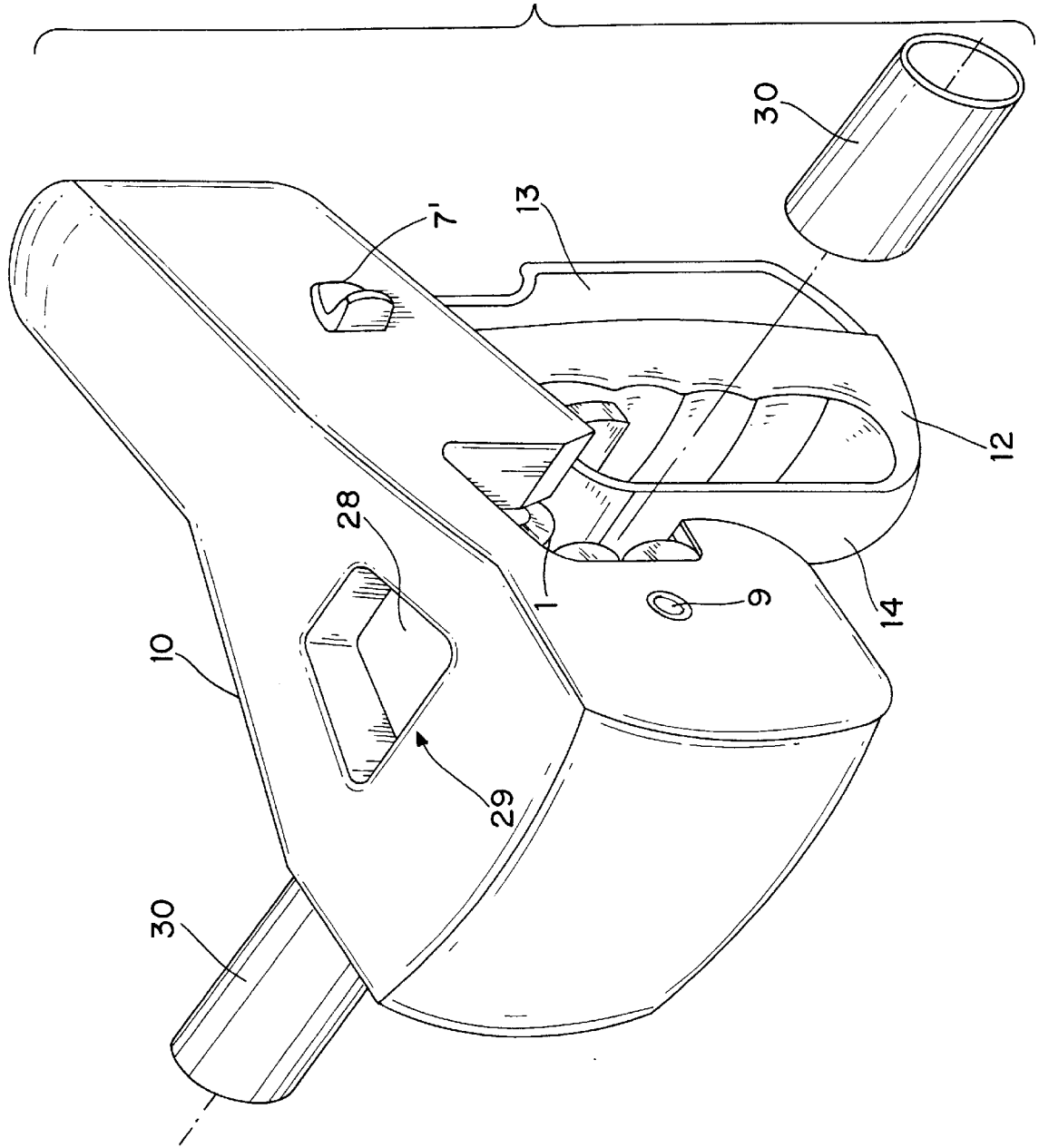

20

EASY CUTTER

BACKGROUND OF THE INVENTION

This invention relates, in general, to cutters, and, in particular, to pipe or tube cutters.

DESCRIPTION OF THE PRIOR ART

In the prior art various types of cutters have been proposed. For example, U.S. Pat. No. 4,802,278 to Vanderpol et al discloses a tube cutting tool in which a cutting head is mounted within a C-shaped slot to allow the cutter to be placed laterally over a tube.

U.S. Pat. No. 5,088,196 to Fukuda discloses a pipe cutter in which a housing carries a disk which can be selectively rotated in a forward or reverse direction.

U.S. Pat. No. 5,133,234 to Ehlert et al discloses a cutting device for opening a container in which the container is rotated by a handle against the cutter.

U.S. Pat. No. 5,103,699 to Brown discloses a cutter for tube or pipe including a main body having a cutter in which the main body is rotated in order to perform the cutting action.

U.S. Pat. No. 5,301,427 to Swatek discloses a handheld pipe cutter which has an electric controller to determine the linear length of tubing which passes through the cutter.

U.S. Pat. No. 5,315,759 to Mashata discloses a pipe a cutting device having a pair of guide wheels with a manually movable cutting wheel aligned between the guide wheels.

SUMMARY OF THE INVENTION

The present invention comprises a cutting tool for cutting pipes or tubes, and in which the cutter has a pair of driving wheels, which can be driven by either AC or DC power. The driving wheels are positioned adjacent a cutting wheel that is operated by a lever to advance the cutting wheel against the item to be cut. The cutting wheel is locked against the item to be cut by a releasable latch. In addition, a deburring tool is provided which can be attached to remove any irregularities in the cut pipe or tube.

It is an object of the present invention to provide a new and improved cutting tool for pipes or tubes.

It is an object of the present invention to provide a new and improved cutting tool for pipes or tubes that is electrically operated.

It is an object of the present invention to provide a new and improved cutting tool for pipes or tubes which has a positive lock for securing the cutting wheels against an item to be cut.

These and other objects and advantages of the present invention will be fully apparent from the following description, when taken in connection with the annexed drawings.

BRIEF DESCRIPTION OF THE DRAWINGS

FIG. 3 is a perspective view of the present invention.

DESCRIPTION OF THE PREFERRED EMBODIMENT

Figure 1:
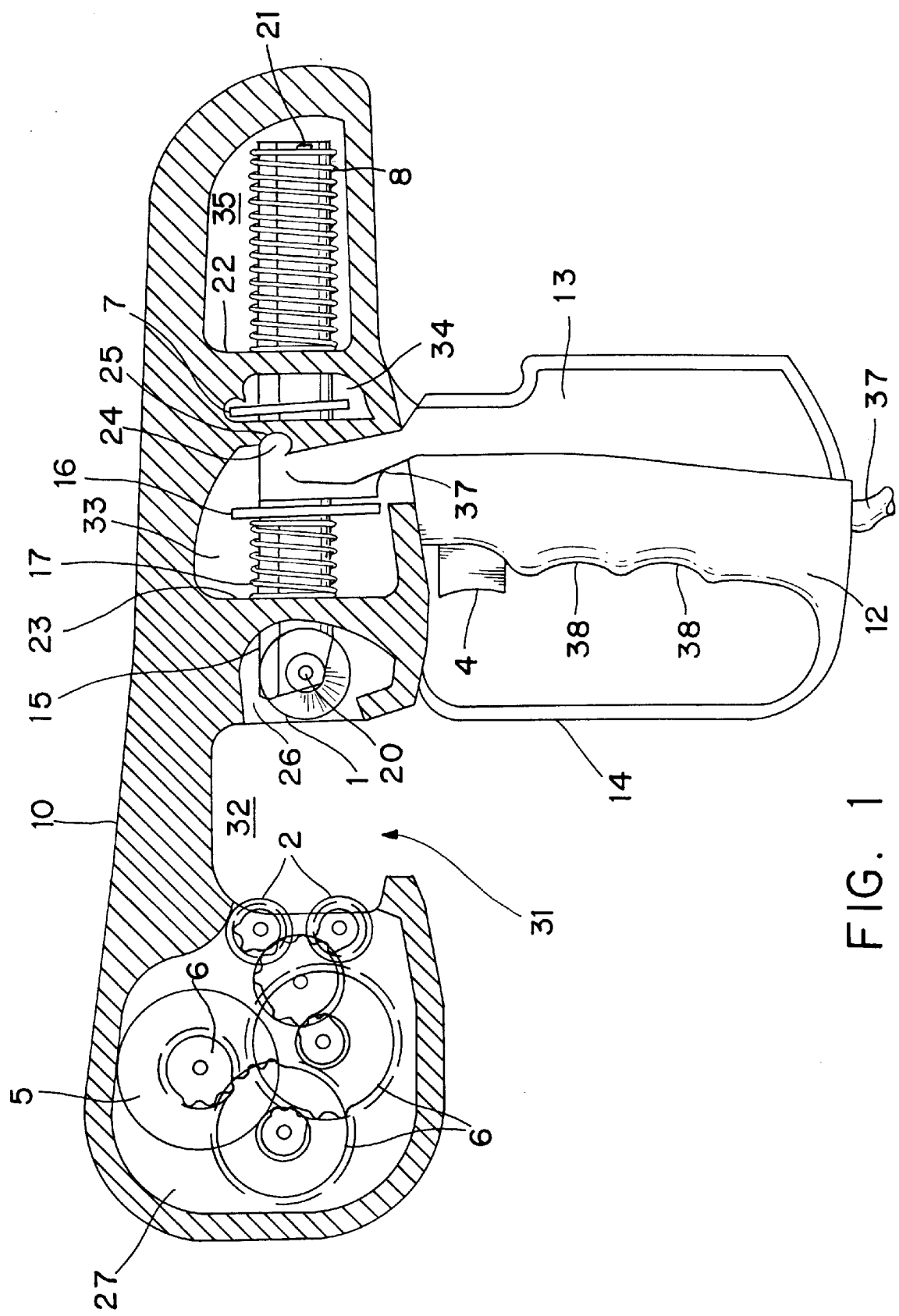
FIG. 1 is a side cross-sectional view of the present invention.

Referring now to the drawings in greater detail, FIG. 1 shows the cutting tool of the present invention. The tool has a housing 10 which can be made from any conventional material such as, but not limited to, a light cast metal alloy or ABS type plastic. At one end (to the left in FIG. 1) is a first cavity 27 which houses the motor 5, the gear reducer system 6, which consists of a series of gears that reduces the speed from the motor and thereby increases the torque that is delivered to the driving wheels 2. The motor and gear reduction system are conventional, and therefore, no further description will be given.

Figure 2:
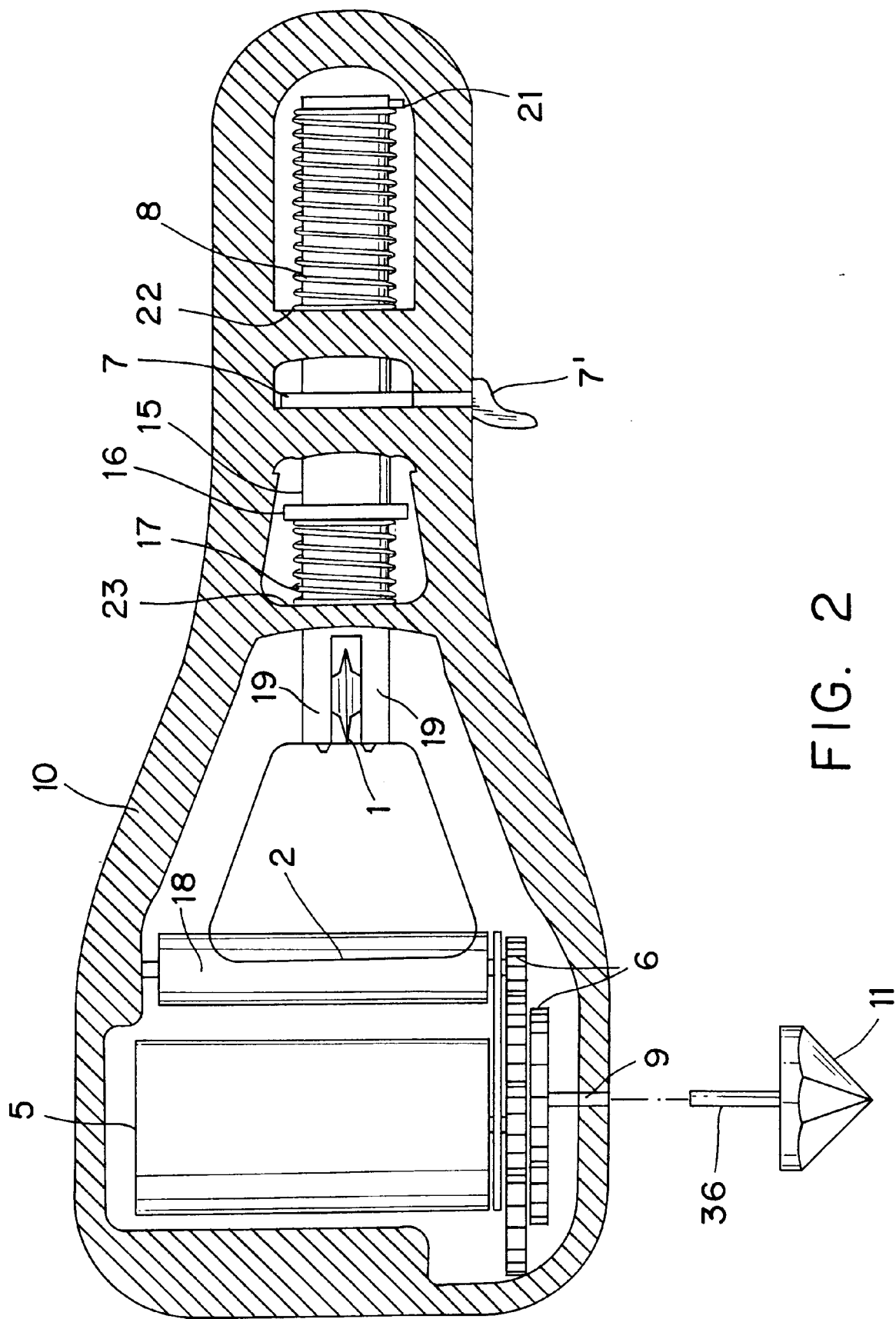
FIG. 2 is a top cross-sectional view of the present invention.

As can be seen in FIG. 2, the surface of the driving wheels 2 has a series of diamond shaped grooves 18 which improve traction on the item 30 (a pipe or tube) to be cut.

The driving wheels 2 are spaced from the cutting wheel 1 by means of a second cavity 32. The cavity 32 has an aperture or slot 31 which allows the item 30 to be cut to be inserted through the slot 31 and into the cutting position. In this way, the item to be cut does not have to be inserted from the end, but rather, can be inserted anywhere along its length into the cutter. The cutting wheel 1 is secured to the end of a bar 15. The bar 15 has a pair of arms 19, as shown in FIG. 2, which receive the cutting wheel therebetween, and a removable pin 20 passes through apertures in the arms and the cutting wheel to hold the wheel assembled with the bar 15. The pin 20 can be removed to replace the cutting wheel 1 when the wheel becomes dull.

The bar 15 extends toward the rear of the housing 10 as shown in FIG. 1. Behind a third cavity 26, which houses the cutting wheel, is a fourth cavity 33, which houses a return spring 17, for the handle 13, which surrounds the bar 15. The spring 17 presses against the wall 23 at one end and against the flange 16 at its other end, for a reason to be explained below. A fifth cavity 34 is positioned behind cavity 33, which houses a latch 7 for holding the bar 15 in a selected position. A sixth cavity 35 houses the end of the bar 15, and a return spring 8 which moves the bar 15 to the right, as shown in FIG. 1, when the latch 7 is released. The spring 8 surrounds the bar 15 and abuts against wall 22 on one end, and against a stop 21, which is affixed to the bar 15, at another end.

As shown in FIG. 2, a deburring tool 11, having a shaft 36, can be attached to the cutting tool by inserting the shaft 36 into an aperture 9. This will connect the shaft 36 to the motor, either directly or indirectly by means of the gear reduction system 6. Once the deburring tool is attached to the cutting tool, any irregularities in the cut item can be removed by squeezing the trigger 4 which will activate the motor 5, which will rotate the tool 11.

In addition, as shown in FIG. 3, a window or aperture 28 is positioned in the top of the housing 10, directly over the cavity 32 which receives the item to be cut. This window allows the operator to see if the item to be cut is properly positioned within the cutting tool. Also, an indicator 29 is positioned at the center of the window 28, to help the user align the cutting tool with a mark that can be placed on the item to be cut, and thereby allow the operator to cut the item at a precise position.

In order to use the cutting tool, the user would mark the item 30 to be cut, and then insert the item into slot 31. Then by looking through the window 28, the user could align the indicia 29 with the mark on the item to be cut. Once the mark and the indicia are aligned, the user would grip the handle by placing his/her fingers between guard 14 and the handle 12 which has finger grip positions 38. The guard 14 will keep the user's hand from being beneath the item to be cut in order to prevent the item or pieces of cut material from hitting his/her hand.

Next, the user would press lever 13 with the heal of his/her hand, which would move the top of the lever toward the left, in FIG. 1. This will separate the portion 24 on the lever from the stop 25 and press the top of the lever against the flange 16. Continued pressure against the flange 16 will force the bar 15 against the spring 17, thereby compressing it and at the same time move the bar 15, with the cutting wheel 1 against the item to be cut.

The cutting wheel will be held in this position, against the item to be cut, by latch 7, so the user will not have to maintain constant pressure with the heel of his/her hand in order to hold the cutting wheel against the item 30 to be cut. The latch 7, as shown in FIG. 1 is a flat plate with an aperture in the center. The aperture will have a vertical dimension which is slightly larger than the vertical dimension of the rod 15. As the rod moves toward the left, in FIG. 1, the plate will tilt as shown, and the top of the aperture will engage the top of the rod or shaft 15, and the bottom of the aperture will engage the bottom of the rod or shaft 15. This, will in affect shorten the vertical dimension of the aperture in the plate 7, and will hold the shaft 15 in position and prevent the rod from moving toward the right in FIG. 1. In order to release the shaft 15, the release button 7', shown in FIG. 3, will be pressed. This will straighten the plate 7, and will in affect lengthen the vertical dimension of the aperture in the plate 7, thereby allowing the shaft 15 to move with respect to the aperture in the plate 7.

Once the cutting wheel 1 is placed against the item 30 to be cut, the user will squeeze the trigger 4, which will operate the motor 5, the gear reduction system 6 and the drive wheels 2. The trigger 4 will be similar to the variable speed mechanism that is used in tools such as electric drills. Since this mechanism is conventional, no further description will be given.

When the trigger 4 is pressed, the drive wheels 2, with their diamond surface 18 will grip the surface of the item 30 to be cut and cause it to rotate against the cutting wheel 1. As the cutting wheel cuts into the item 30, the operator can move the cutting wheel further against the item by squeezing the lever 13, and the latch plate 7 will allow the shaft 15 to move toward the left in FIG. 1, but the slant on the latch plate 7, will prevent the shaft 15 from moving toward the right.

When the item 30 has been completely cut, the user will release the trigger 4, which will stop the motor and the driving wheels. Next, the user will release the latch plate 7 by pressing on the release lever 7'. If there are burrs or rough spots on the cut item, the user will insert the deburring tool 11, press the trigger 4 which will cause the deburring tool to rotate and smooth any rough spots on the cut item.

It should be noted that the motor 5 could be connected to a source of AC current by means of a conventional electrical cord 37 (shown partially in FIG. 1) which will be connected to a conventional AC outlet, or it could be battery operated. Since both of these types of power sources are conventional and used with many different types of hand tools, no further description will be given.

Although the Easy Cutter and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A cutting tool for cutting an item, said cutting tool; comprising:

a housing, said housing having a cavity for holding a motor, at least one driving wheel connected to said motor, means for turning said motor on and off, said housing having a second cavity, with said at least one driving wheel communicating with said second cavity at one side of said second cavity, a cutting wheel reciprocatingly mounted in another side of said second cavity opposite from said at least one driving wheel, said cutting wheel being mounted on a shaft, said shaft being movable from a first position where said cutting wheel is out of contact with said item, to a second position where said cutting wheel is in contact with said item, and means surrounding said shaft for holding said cutting wheel in contact with said item, and wherein said means for holding said cutting wheel in contact with said item comprises a plate having an aperture therein, said shaft passing through said aperture, said shaft having a height and a width, said aperture having a height and a width, at least said height of said aperture being larger than said height of said shaft.

2. A cutting tool for cutting an item, said cutting tool; comprising:

a housing, said housing having a cavity for holding a motor, at least one driving wheel connected to said motor, means for turning said motor on and off, said housing having a second cavity, with said at least one driving wheel communicating with said second cavity at one side of said second cavity, a cutting wheel reciprocatingly mounted in another side of said second cavity opposite from said at least one driving wheel, said cutting wheel being mounted on a shaft, said shaft being movable from a first position where said cutting wheel is out of contact with said item, to a second position where said cutting wheel is in contact with said item, and means surrounding said shaft for holding said cutting wheel in contact with said item, and wherein said housing has a handle depending therefrom, said handle having a trigger means for turning said motor on and off, and wherein said handle also has means for moving said shaft from a first position where said cutting wheel is out of contact with said item, to a second position where said cutting wheel is in contact with said item.

3. A cutting tool for cutting an item, said cutting tool; comprising:

a housing, said housing having at least one driving wheel, a cavity in said housing for holding means for driving said driving wheel, means for turning said means for driving said driving wheel on and off, said housing having a second cavity, with said at least one driving wheel communicating with said second cavity at one side of said second cavity, a cutting wheel reciprocatingly mounted in another side of said second cavity opposite from said at least one driving wheel, said cutting wheel being mounted on a shaft, said shaft being movable from a first position where said cutting wheel is out of contact with said item, to a second position where said cutting wheel is in contact with said item, and means surrounding said shaft for holding said cutting wheel in contact with said item, and wherein said means for holding said cutting wheel in contact with said item comprises a plate having an aperture therein, said shaft passing through said aperture, said shaft having a height and a width, said aperture having a height and a width, at least said height of said aperture being larger than said height of said shaft.

4. The cutting tool as claimed in claim 1, wherein said cutting tool has means for releasing said means for holding said cutting wheel in contact with said item, said means for releasing said means for holding said cutting wheel in contact with said item extending outside of said housing.

5. The cutting tool as claimed in claim 1, wherein said housing has a handle depending therefrom, said handle having a trigger means for turning said motor on and off.

6. The cutting tool as claimed in claim 2, wherein said means for moving said shaft from a first position to a second position is a lever, said lever having a first portion adjacent said handle, and a second portion adjacent said shaft.

7. The cutting tool as claimed in claim 6, wherein said lever second portion engages a plate attached to said shaft.

8. The cutting tool as claimed in claim 7, wherein a spring is positioned around said shaft, and one end of said spring abuts against said plate and another end of said spring abuts against a wall within said housing.

9. The cutting tool as claimed in claim 8, wherein a second spring is positioned around said shaft, said second spring extending between a stop affixed to said shaft and a wall within said housing.

10. The cutting tool as claimed in claim 1, wherein a deburring tool is connected to said motor.

11. The cutting tool as claimed in claim 1, wherein said at least one driving wheel has a roughened surface.

12. The cutting tool as claimed in claim 11, wherein said roughened surface is a plurality of grooves placed in a diamond shape.

13. The cutting tool as claimed in claim 1, wherein said second cavity has two sides, a top, an open bottom and open ends.

14. The cutting tool as claimed in claim 13, wherein said top of said second cavity has an opening therein, whereby said driving wheels are visible through said opening.

15. The cutting tool as claimed in claim 14, wherein said opening has an indicia means for aligning said item to be cut.

* * * * *